Nov. 24, 1925. C. S. BURTON Re. 16,217

VACUUM FUEL FEEDING DEVICE FOR INTERNAL COMBUSTION ENGINES AND THE LIKE

Original Filed March 22, 1922

Witness.
H. T. Wright

Inventor.
Charles S. Burton.
by Burton & Burton
his Attorneys.

Reissued Nov. 24, 1925.

Re. 16,217

UNITED STATES PATENT OFFICE.

CHARLES S. BURTON, OF OAK PARK, ILLINOIS, ASSIGNOR TO STEWART-WARNER SPEEDOMETER CORPORATION, OF CHICAGO, ILLINOIS, A CORPORATION OF VIRGINIA.

VACUUM FUEL-FEEDING DEVICE FOR INTERNAL-COMBUSTION ENGINES AND THE LIKE.

Original No. 1,439,689, dated December 26, 1922, Serial No. 545,658, filed March 22, 1922. Application for reissue filed February 26, 1925. Serial No. 11,892.

*To all whom it may concern:*

Be it known that I, CHARLES S. BURTON, a citizen of the United States, residing at Oak Park, in the county of Cook and State of Illinois, have invented new and useful Improvements in Vacuum Fuel-Feeding Devices for Internal-Combustion Engines and the like, of which the following is a specification, reference being had to the accompanying drawings, forming a part thereof.

The purpose of this invention is to provide an improved construction in a vacuum fuel feed device for hastening the liquid delivery from the receiving to the delivery chamber, and for other purposes incident thereto. It consists in the elements and features of construction show and described, as indicated in the claims.

In the drawings:—

Figures 1, 2, 3:
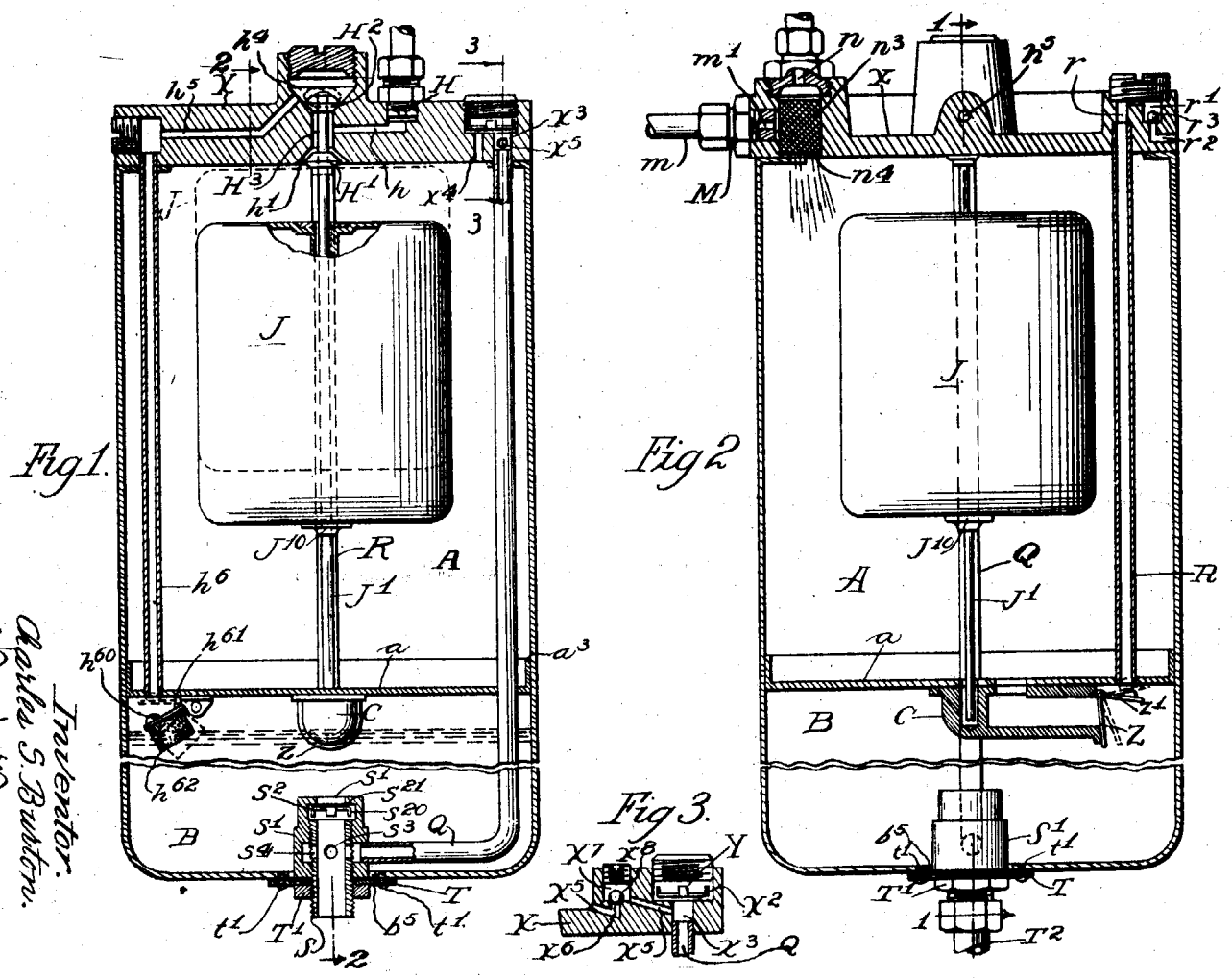
Figure 1 is a vertical section at the line, 1—1, on Figure 2.
Figure 2 is a vertical section at the line, 2—2, on Figure 1.
Figure 3 is a detail section at the line, 3—3, on Figure 1.

In the drawings there is shown a vacuum tank having a receiving chamber, A, and a delivery chamber, B, separated by a diaphragm, *a*, through which the liquid fuel is delivered from the chamber, A, into chamber, B, past a check valve, C, of familiar form and operation. The receiving chamber is closed at the top by a cap plate X, in and through which the various connections of the tank for liquid supply, suction and atmosphere vent, and the like are made, as hereinafter described. The delivery chamber is finished at the bottom by an outflow fitting comprising two members, *s* and $s^1$, mounted in a closure plate, T. Said closure plate being employed for the purpose of permitting an adequately sized opening in the bottom of the tank for convenience in making the necessary connections of the fitting, S, as hereinafter particularly described.

The suction connection is indicated by the fitting, H, and the suction port, *h*, is controlled by a valve, $H^1$, operatively connected with the float, J, for seating said valve, $H^1$, by the rise of the float to a predetermined high liquid level indicated by the dotted line, *j*, Preferably, the float has a range of movement on the stem, $J^1$, of the suction valve, between the upper and lower stops, $j^1$, $j^{10}$, respectively, so that upon the liquid level falling a certain distance, the float becomes lodged on the lower stop, and upon the level further falling, diminishing the submergence of the float, the effective or unbuoyed weight of the float ultimately becomes sufficient to break the suction hold upon the valve, $H^1$, whereupon the float descends with the valve stem to the lowest position shown in full line in Figures 1 and 2.

The liquid supply connection is indicated by the fitting, M, which connects the pipe, *m*, leading from the low source of supply not shown with the fuel inlet duct, $m^1$, formed in the cap plate, X. The atmosphere inlet duct is shown at *n* opening into the fuel inlet duct, $m^1$, a little back of the discharge mouth of said duct into the chamber, A. The junction of the air inlet duct and the fuel inlet passage is lined with a fine woven wire screen or strainer thimble or sleeve, $n^3$, which serves two purposes, first, to restrict the air inlet, and second, to prevent the entrance of dust either with the air or the fuel. This woven wire screen or strainer masks the port of communication of the air inlet with the liquid fuel inlet at the aperture, $n^4$, and stands directly in the path of the in-coming liquid, so that when the inflow of liquid is occurring, the entrance of air is very largely prevented or reduced.

The suction duct, *h*, is T-shaped, the suction port, $h^1$, at which the valve, $H^1$, seats being at one end of the cross of the T. The other end of this cross passage opens into a small valve chamber, $h^4$, from which a duct, $h^5$, leads down through the cap and is connected by a tube, $h^6$, which extends through the chamber, A, and the diaphragm, *a*, to the lower chamber, B. A valve, $H^2$, similar to the valve, $H^1$, and connected with the latter by a slender stem, $H^3$, which extends through the cross member of the T-shaped passage mentioned, seats at the opposite end of said cross passage from that at which the valve, H, is seated. From this construction it will be seen that the movement of the suction-controlling valve, $H^1$, for seating at the port, *h*, unseats the valve, $H^2$, from its seat at the other end of the cross passage, and vice versa, that the unseating of the valve, $H^1$, seats the valve, $H^2$. The purpose and operation of the device in this respect is, that when the suction is cut off from the receiving chamber, A, it is instantly and by the same action of the valve device, shifted onto the chamber, B. The purpose of such shifting is, that whereas the restriction of the atmosphere inlet to the chamber, A, (which may be caused in any manner, and which is caused by the fine mesh wire, screen or strainer, $n^3$, at the atmosphere inlet port) is necessary in order that the air inlet may not be so free as to defeat the operation of the suction for lifting the liquid from the lower source to the chamber, A, nevertheless such restriction tends to restrict the rate of delivery of the liquid by gravity from the chamber, A, to the chamber B; and to overcome or offset this restriction the suction is transferred to the chamber, B, when it is cut off from the chamber, A, so that the liquid is "pulled" out of the chamber, A, by the suction; and its flow, therefore, is not limited merely by the gravity action. That is to say, the suction operating in the chamber, B, upon the shifting of the suction valves as described, offsets the air restriction at the air inlet to the chamber, A, for the purpose of delivery of liquid from the chamber, A, to the chamber, B.

By reason of the transfer of suction to the chamber, B, as described, for hastening the delivery of liquid from the vacuum chamber to said chamber, B, there can be no delivery by gravity from chamber, B, during the delivery of liquid into the chamber, B, from the vacuum chamber, A; and the supply to the carbureter during these intervals,—while the chamber, B, is filling, is afforded by the connecting passage from the chamber, B, to the carbureter, which includes the cavity of the delivery fitting from said chamber, B, which for that purpose may be made of considerable size if so desired. This delivery fitting consists of a threaded nipple, S, on the upper end of which there is screwed a cap member, $S^1$, which has an interior annular recess, $s^4$, positioned for registering with a series of radial openings, $s^3$, in the nipple, S. The cap, $S^1$ has a central aperture in its head at $s^1$, upon the under side of which there is provided for seating upward thereagainst, a check valve, $s^2$, which is in the form of a thin metal disk having struck and folded down from its margin, lugs, $s^{20}$, leaving marginal notches or apertures, $s^{21}$, for the passage of the liquid around said disk valve. The lugs, $s^{20}$, constitute legs by which the valve is stepped on the upper end of the nipple, S, being guided by the projections between the marginal apertures for short up-and-down movement seating upwardly, as stated, at the margin of the aperture, $s^1$. Into the side of the cap, $S^1$, the lower end of the tube, Q, is soldered fast, said tube being bent to terminate horizontally at its lower end for this connection. Preferably the nipple, S, is inserted through a closure plate, T, which is of sufficiently greater diameter than a central aperture, $b^5$, in the bottom of the chamber, B, to be lapped at the margin thereof for securement thereto as shown by screws, $t^1$, $t^1$, suitable packing being interposed to make a tight joint. The purpose of providing this aperture and closure plate is to facilitate the assembling of the fitting.

The tube, Q, is soldered or otherwise made tight and secure at its point of insertion through the diaphragm, $a$, before that diaphragm is introduced into the body member of the device, which is done by passing it down through the open upper end of the proper point and soldering its flange, $a^3$, to the body member which forms the walls of the chambers, A and B. When thus connected, the cap member, $S^1$, carried upon the horizontally-projecting lower end of the tube, Q, is positioned substantially centrally with respect to the aperture, $b^2$, and the nipple, S, being screwed into the cap a suitable distance to position the valve, $S^1$, with respect to its seat and the recess, $S^4$, in registration with the aperture, $S^3$, the closure plate, T, is passed over the nipple and followed by a securing nut $T^1$, and said closure plate is then secured by screws, $t$ to the bottom of the chamber. The protruding end of the nipple, S, serves for connecting any suitable fitting for attaching a pipe, $T^2$, to conduct the liquid to the carbureter.

The pipe, Q, is extending up through the chamber, A, and into the cap, X, where it is connected, not only for atmospheric inlet to the fitting, S, and thereby to the pipe connection with the carbureter, but also for the purpose of permitting expansion of liquid which may occur from overheating of the device to find relief by discharge back into the chamber, A, from the chamber, B, or from the pipe connection,—including the fitting, S, of said chamber, B, with the carbureter. For these two purposes the connection of said pipe, Q, with the cap and the duct passages in the cap, X, are as follows: In the cap, X, there is formed a valve chamber which, as illustrated and in the preferred form, has a flat seat, $x^2$, through which there are made two ports, $x^3$ and $x^4$. Into the port, $x^3$, the upper end of the tube, Q, extends and may be fitted tightly, though an absolutely non-leaking fit is not necessary. The other port opens directly into the upper end of the chamber, A. In the valve chamber, $X^2$, there is a thin disk valve, Y, which is dimensioned for seating over and covering both the ports, $x^4$ and $x^3$. The operation of this construction is that suction operating in the chamber, A, or in the chamber, B, will seat the valve, Y, over both ports, but pressure in either chamber will open the valve and permit discharge from one chamber to the other. Obviously the only discharge by pressure will be from the lower chamber into the upper, and in the upper chamber there will always be space which will be available to accommodate any liquid or vapor which may be forced over into the upper chamber from the lower, because at the high liquid level of the upper chamber, A, it is considerably short of being filled. And in any event, the upper end of the chamber, A, being in open communication through the pipe, $m$, with the main tank which is a source of fuel supply at low level, any amount of liquid which might be forced over from the lower chamber, B, into the upper chamber, A, would in the last emergency be carried over into and through the pipe, $m$, to the main tank below. For the purpose of the atmospheric inlet through the pipe, Q, to the chamber, B, and to the delivery or discharge pipe therefrom, the cap plate, X, has an atmosphere inlet duct, $x^5$, which opens into the port or duct, $x^3$, below the valve chamber, $X^2$; and this atmosphere inlet duct, $x^5$, has a downwardly-extending portion, $x^6$, at the upper end of which is a small valve chamber, $x^7$, in which there is a small ball valve, $x^8$, seating at the upper end of said downwardly-extending portion of the duct and adapted to open for inlet of air but seating upon any pressure from within tending to discharge outwardly, so that the discharge of liquid out through this atmosphere inlet in case of expansion of liquid in the chamber is rendered impossible.

For affording atmospheric inlet to the chamber, B, to permit delivery therefrom past the check valve, $S^2$, toward the carbureter, a pipe, R, is provided extending down through the diaphragm, $a$, and up into the plate, X, where it leads into a duct, $r$, which opens laterally into a small chamber, $r^1$, from the bottom of which a duct, $r^2$, leads to the atmosphere. A check valve, $t$, seating at the upwardly open mouth of the duct, $r^2$, opening upwardly for inflow of air, but being seated by any pressure tending to cause outflow from the chamber, B.

To prevent liquid being drawn up through the tube, $h^6$, which might happen after the lower chamber, B, became full, a float-operated valve, $h^{60}$, is provided at the entrance to said pipe, $h^6$. A convenient form and mounting for such valve is shown, the valve being carried on a short lever arm, $h^{61}$, pivoted on the under side of the diaphragm, $a$, and up into the plate, X, where it leads into a duct, $r$, which opens laterally into a small chamber, $r^1$, from the bottom of which a duct, $r^2$, leads to the atmosphere. A check valve, $t$, seating at the upwardly open mouth of the duct, $r^2$, opening upwardly for inflow of air, but being seated by any pressure tending to cause outflow from the chamber, B.

To prevent liquid being drawn up through the tube, $h^6$, which might happen after the lower chamber, B, became full, a float-operated valve, $h^{60}$, is provided at the entrance to said pipe, $h^6$. A convenient form and mounting for such valve is shown, the valve being carried on a short lever arm, $h^{61}$, pivoted on the under side of the diaphragm, $a$, and having below the valve a float, $h^{62}$, which may be a small piece of cork or the like which will float the valve to its seat before the liquid rises to the entrance of the pipe, $h^6$. To prevent this air inlet passage from defeating the operation of the suction for supplementing the gravity action for hastening delivery of liquid from chamber, A, into chamber, B, the pipe, R, may have its mouth in the chamber, B, positioned as shown in Figure 2, opposite the valve, Z, which is swung open by the discharge of liquid from chamber, A, and the back side of said valve may be formed as seen at $Z^1$, as a valve for closing the mouth of pipe, R, when the liquid is flowing out of chamber, A. This will not entirely prevent access of air through pipe, R, during suction in chamber, B, but it will so far restrict it as to leave the suction effective for the purpose of hastening the delivery of liquid from the chamber, A, into chamber, B.

I claim:—

1. A vacuum fuel feeding device comprising a receiving chamber and a delivery chamber, the receiving chamber having a restricted air inlet; a duct connecting the upper part of the two chambers; a suction connection from said duct; valve seats in said duct respectively on the side of said suction connection toward and on the side thereof away from the receiving chamber; a valve device positioned for seating alternatively on one or the other of said seats, and means operated by change of level of the liquid in the delivery chamber for shifting the seating of said valve device from one seat to the other.

2. The construction as defined in claim 1, foregoing, having the two valve seats facing toward each other and the valve device comprising two valve heads and an operating connection between them extending through both seats.

3. In the construction as defined in claim 1, foregoing, the two valve seats being faced in opposite directions and the valve device being adapted to be shifted bodily from one seat to the other; the means for shifting the valve device being a float in the receiving chamber and a stem connected with the valve device and provided with means for encounter of the float in the rise and fall of the latter.

4. In the construction defined in claim 1, foregoing, the delivery chamber having an air inlet and a liquid outlet provided with a one-way seating valve opening in the direction for outflow.

5. In the construction defined in claim 1, foregoing, the delivery chamber having an air inlet and a liquid outlet provided with a one-way seating valve opening in the direction for outflow of liquid; a conduit for the liquid leading from said outlet and an air vent from said conduit consisting of a duct extending upward to a point above the high liquid level of the receiving chamber.

6. In the construction defined in claim 1, foregoing, the delivery chamber having an atmosphere inlet passage and a check valve therein adapted to open for air entrance and to be held seated by pressure or flow out of said delivery chamber.

7. In the construction defined in claim 1, foregoing, the delivery chamber having an atmosphere inlet duct and a valve for closing the same, said valve being exposed to the flow of liquid delivered from the vacuum chamber in a direction for being closed thereby.

8. In the construction defined in claim 1, foregoing, the delivery chamber having an atmosphere inlet passage, a valve therein adapted to open for air entrance and to be held seated by pressure or flow outward from said chamber, and a second valve for closing said passage positioned in the delivery chamber for exposure to the flow of liquid into said chamber from the vacuum chamber in a direction for being closed by said flow.

9. In a vacuum fuel feeding device having a vacuum chamber, a chamber into which the vacuum chamber delivers liquid past a non-return valve, and a third chamber or passage into which the second chamber delivers liquid past a second non-return valve in combination with said chambers and valves; a duct leading from the upper part of the third chamber back to the first chamber, said duct comprising a valve chamber having a valve seat with ports therein leading to the third and first chambers respectively, and a valve device in said valve chamber which seats at both of said ports by one and the same seating movement.

10. In the construction defined in claim 9, foregoing, a branch from the before-mentioned duct leading off therefrom between said third chamber and said valve chamber to the atmosphere, and a check valve in said branch duct opening for atmosphere inlet and adapted to be held seated by pressure or flow outward.

11. In the construction defined in claim 1, a float operated valve for closing the mouth in the delivery chamber of the duct mentioned which connects the upper part of said chamber, whereby said duct mouth is closed by the rise of liquid in the delivery chamber, to a predetermined height.

12. In the construction defined in claim 1, foregoing, a valve located in the delivery chamber controlling delivery of liquid from the receiving chamber, an atmosphere inlet duct opening in the upper part of the delivery chamber and means by which the opening of said valve by and for outflow from the receiving to the delivery chamber closes the mouth of said air inlet duct.

In testimony whereof, I have hereunto set my hand at Chicago, Illinois, this 22nd day of January, 1925.

CHARLES S. BURTON.